United States Patent Office 2,975,125
Patented Mar. 14, 1961

2,975,125

INHIBITOR COMPOSITIONS

Albert J. Saukaitis, Wayne, George S. Gardner, Elkins Park, and Gregory L. Gibson, Jenkintown, Pa., assignors to Amchem Products, Inc., a corporation of Delaware No Drawing. Filed Mar. 1, 1957, Ser. No. 643,251

4 Claims. (Cl. 252—8.55)

This invention relates to inhibitor compositions for preventing or greatly minimizing acid attack on metals—particularly steel. It is especially useful in reducing the corrosion which occurs during the acidizing of oil wells and for this reason, it will be exemplified in the present disclosure by reference to that particular field, although, it should be understood that its usefulness is not to be limited to that field.

In the petroleum industry it has been observed that the oil well tubing known as N–80 tubing is extremely susceptible to corrosion by the strong mineral acids employed in the process of well acidizing. Tubing of this kind is fabricated from SAE 1016 steel which steel is particularly susceptible to acid attack at those points where it has been machined as, for example, at the threaded ends of the tube sections. Certain familiar corrosion inhibitors, such as arsenic and basic nitrogeneous coal tar fractions ordinarily employed in well acidizing operations, have proven to be of little value in protecting this type of tubing from the corrosive effects of the acids.

With the foregoing in mind the principal object of the present invention is to provide improved inhibitor compositions for reducing acid attack on metal and particularly for protecting oil well tubing against the attack of the well acidizing fluids customarily employed in the industry. More specifically it is the object of our invention to provide an improved inhibiting material which is especially useful for protecting N–80 well tubing.

Our invention is based on the discovery that the rate of corrosive attack on the metal of the well tubing during the process of acidizing can be substantially reduced by using an inhibiting composition consisting essentially of a mixture of propargyl alcohol and a compound from the class represented by the formula

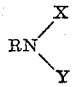

where R is a radical selected from the group consisting of abietyl, hydroabietyl and dehydroabietyl, Y is the group —CH$_2$R′, X is hydrogen or the radical —CH$_2$R′, and R′ represents alpha ketonyl groups.

Compounds represented by the formula above given and methods of preparing them are disclosed in United States Patent 2,758,970 and the compounds are exemplified by those which can be obtained from the reaction of rosin amine hydrochloride with acetone and formaldehyde as shown in the following equations:

(1)

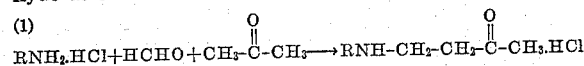

(2)

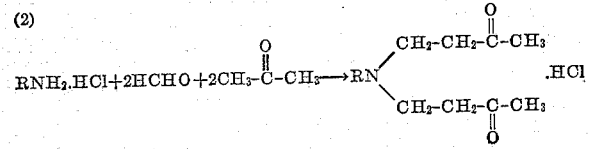

Various procedures for producing materials which are representative of the rosin amine derivatives resulting from the above equations are disclosed in the patent referred to so they need not be repeated herein although, for the sake of convenience, the following is cited as a typical example:

2.34 parts by weight of rosin amine are placed in a closed reaction vessel equipped with a reflux condenser. To this there is added 0.78 part of acetophenone with stirring. Stirring is continued and 1.00 part of 20° Bé. hydrochloric acid is added slowly and carefully. When all of the material is in solution 0.97 part of 37% formaldehyde is added over a period of two hours. The mixture is stirred and heated to 80° C. for 24 hours. The contents of the vessel are then cooled to 50° C. and 2.50 parts of acetone are added. The mixture is stirred until mixing is complete and 0.95 part of 37% formaldehyde is added during approximately one hour. The reaction mixture is then refluxed for 24 hours, after which the excess acetone is distilled off.

The contents of the vessel are then allowed to cool. The resultant product is a corrosion inhibitor and can be blended, as desired, into formulations containing wetting agents, dispersing agents, other inhibitors and the like. According to well known practice in the inhibitor art, an inhibitor composition containing a wetting agent may be produced by adding to the material of the above example 1.40 parts of Tergitol NP–35 which is a product manufactured under this trademark by Carbide and Carbon Chemicals Company which product is said to be a non-ionic wetting agent consisting of an alkyl phenol-ethylene oxide condensation product. (See the Technical Information Bulletin distributed in April 1954 by Carbide and Carbon Chemical Company.) To this mixture 0.87 part of isopropyl alcohol is added to lower the viscosity of the mass. For the purposes of the present disclosure the final mixture will be designated herein as Inhibitor Composition A. This Inhibitor Composition A may be admixed in various proportions with propargyl alcohol to produce inhibitor compositions coming within the scope of the present invention as per the following:

EXAMPLE 1

Mix three gallons of Composition A with one gallon of propargyl alcohol which mixture will be designated Inhibitor Composition B.

EXAMPLE 2

Mix three gallons of Inhibitor Composition A with three gallons of propargyl alcohol which mixture will be designated Inhibitor Composition C.

At this point we should like to emphasize the fact that excellent inhibitor compositions according to the present invention can be produced by quite a wide variety of proportions as between a composition such as Composition A of the prior art and propargyl alcohol. In fact, even a relatively small quantity of propargyl alcohol in relation to an inhibitor of the type of Composition A will produce a markedly improved inhibiting composition because the two ingredients together seem to have a synergistic effect on each other or possibly the propargyl alcohol has a catalytic-like effect on the inhibiting qualities of inhibitors coming under the class of Composition A. Actually we do not by any means understand the result which is achieved by mixing these materials but we do know that the degree of improvement in inhibiting power of the propargylic admixture is astonishingly great and far more than would normally be expected in this art. Therefore, while we do not wish to be limited to any exact proportions we have found from experience that excellent and commercially practical results can be obtained by a mixture of one part of propargyl alcohol with from 0.5 to 3.0 parts of a material like Composition A which is typical of the compounds which are useful in our invention.

Compositions A, B and C were tested for inhibiting value according to the following procedure:

One inch sections cut from N-80 tubing were sectioned into 8 equal parts to give test specimens with a total surface area of 2.25 sq. in. These specimens were cleaned by sand blasting prior to use. The testing bath consisted of 200 ml. of 15% by weight hydrochloric acid maintained at a temperature of 200° F. during the test period of 16 hours. The inhibitors of the above examples were added to the baths in amounts equivalent to the concentrations shown in Table 1 below. The cleaned and weighed test specimens were then placed in the inhibited acid baths and kept therein for the prescribed period of 16 hours. They were then removed, rinsed, thoroughly dried and weighed. The loss of weight of each specimen is shown in the table:

Table 1

| Test No. | Inhibitor | Inhibitor Concentration, Gals./1,000 Gals. Acid | Weight Loss, lbs./ft.²/24 hrs. |
|---|---|---|---|
| 1 | A | 4 | 1.220 |
| 2 | A | 6 | 0.690 |
| 3 | A | 10 | 0.320 |
| 4 | B | 4 | 0.370 |
| 5 | C | 6 | 0.046 |

Inspection of the data in the above table amply demonstartes the value of the inhibitor compositions of our invention. For example, comparison of the results of Tests 1 and 4, in each of which the concentration of inhibitor is 4 gallons per 1000 gallons of acidizing fluid, shows that the rate of corrosive attack when the rosin amine derivative alone is used is more than three times the rate found when the combination of rosin amine derivative and propargyl alcohol is employed. At the higher concentration of 6 gallons per 1000, the effect is even more strikingly demonstrated. A comparison of the results of Tests 2 and 5 shows that, at this concentration, the rate of corrosion is approximately thirteen times as great with the rosin amine derivative alone than with the inhibitor composition of our invention. Furthermore, in the latter case the corrosion is reduced to a phenomenally low value. Finally, it should be noted, from Tests 3 and 4, that a very much larger concentration of the rosin amine derivative is required to afford the protection given by the inhibitor composition of our invention.

The following are additional non-limiting examples of compositions that are within the purview of the present invention.

EXAMPLE 3

100 grams of pentanedione-2,4, 217 grams of commercial grade of rosin amine, 92 ml. of 37% formaldehyde solution, and 100 ml. of 20° hydrochloric acid are mixed in a reaction flask. The solution is refluxed for one hour, during which two layers are formed. The mixture is poured into a separatory funnel and the dark, viscous liquid which forms the bottom layer is separated from the supernatant aqueous layer. This bottom layer is then mixed with an equal weight of propargyl alcohol, in which it is completely soluble, to give a dark colored, free flowing solution.

EXAMPLE 4

196 grams of mesityl oxide, 217 grams of commercial grade of rosin amine, and 163 ml. of 37% aqueous formaldehyde solution are placed in a reaction flask. 100 ml. of 20° hydrochloric acid is added, slowly. The mixture is refluxed 2 hours. The mixture, now consisting of two layers, is allowed to settle for two days. The lower layer is separated, and is dissolved in an equal weight of propargyl alcohol.

EXAMPLE 5

217 grams of commercial grade of rosin amine, 232 grams of diacetone alcohol, 163 ml. of aqueous formaldehyde solution, 37% by weight, and 100 ml. of 20° hydrochloric acid solution are mixed in a reaction flask. At the beginning of the reaction the mixture is homogeneous. After refluxing 15 hours the mixture separates into two layers. The lower, oily layer is separated and dissolved in an equal weight of propargyl alcohol.

In general, the inhibitor formulations of the present invention find their most important application in the acidizing of oil wells, although they may be successfully employed in the acid pickling and cleaning of metal surfaces. In the acidizing operation, they are mixed with the acidizing fluid before it is pumped into the well. A usual ratio of the two is approximately 6 gallons of inhibitor to 1000 gallons of acid solution, the latter commonly consisting of hydrochloric acid solution in a concentration of 15% by weight. This acid concentration may be varied, however, and the amount of inhibitor will be varied accordingly, as will be evident to those skilled in the art.

We claim:

1. As an inhibitor, a composition consisting essentially of a mixture of one part of propargyl alcohol and from 0.5 to 3.0 parts of a compound represented by the formula

where R is a radical selected from the group consisting of abietyl, hydroabietyl and dehydroabietyl, Y is the group CH₂R', X is a radical selected from the group consisting of hydrogen and CH₂R', and R' represents alpha ketonyl groups.

2. As an inhibitor, a composition according to claim 1 in which R' is the acetonyl group.

3. As an inhibitor, a composition according to claim 1 in which R' is the group

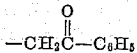

4. An aqueous acidic solution for the acid treatment of oil bearing formations, said solution containing a ninhibitor consisting essentially of a mixture of approximately equal parts by weight of propargyl alcohol and a compound having the following formula

where R is a radical selected from the group consisting of abietyl, hydroabietyl and dehydroabietyl, Y is the group CH₂R', X is a radical selected from the group consisting of hydrogen and CH₂R', and R' represents alpha ketonyl groups, the total quantity of said mixture present in the acidic solution being sufficient to materially reduce the corrosive attack of the solution on metal.

References Cited in the file of this patent
UNITED STATES PATENTS

| 2,510,063 | Bried | June 6, 1950 |
| 2,564,758 | Haggard | Aug. 21, 1951 |
| 2,603,622 | Berger et al. | July 15, 1952 |
| 2,649,415 | Sundberg et al. | Aug. 18, 1953 |
| 2,758,970 | Saukaitis et al. | Aug. 14, 1956 |
| 2,799,659 | Mayhew et al. | July 16, 1957 |
| 2,814,593 | Beiswanger et al. | Nov. 26, 1957 |
| 2,913,408 | Pumpelly et al. | Nov. 17, 1959 |